(12) United States Patent
Li

(10) Patent No.: US 8,892,640 B2
(45) Date of Patent: Nov. 18, 2014

(54) ACCESS CONTROL METHOD AND SYSTEM AND ACCESS TERMINAL

(71) Applicant: Huawei Device Co., Ltd., Shenzhen (CN)

(72) Inventor: Bin Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/717,220

(22) Filed: Dec. 17, 2012

(65) Prior Publication Data

US 2013/0318143 A1 Nov. 28, 2013

Related U.S. Application Data

(63) Continuation of application No. PCT/CN2012/076070, filed on May 25, 2012.

(51) Int. Cl.
*G06F 15/16* (2006.01)
*H04L 29/12* (2006.01)
*H04L 29/08* (2006.01)

(52) U.S. Cl.
CPC ............ *H04L 61/1511* (2013.01); *H04L 67/02* (2013.01); *H04L 67/2814* (2013.01)
USPC ........................... 709/203; 709/201; 709/202

(58) Field of Classification Search
USPC .......................................... 709/201, 202, 203
See application file for complete search history.

(56) References Cited

U.S. PATENT DOCUMENTS

| | | | | |
|---|---|---|---|---|
| 6,151,624 | A | * | 11/2000 | Teare et al. ................... 709/217 |
| 2002/0035624 | A1 | | 3/2002 | Kim |
| 2005/0235044 | A1 | | 10/2005 | Tazuma |
| 2009/0049487 | A1 | | 2/2009 | Koukai et al. |
| 2011/0302298 | A1 | | 12/2011 | Lawrance et al. |
| 2012/0110641 | A1 | * | 5/2012 | Parker et al. ...................... 726/4 |

FOREIGN PATENT DOCUMENTS

| | | |
|---|---|---|
| CN | 1464425 A | 12/2003 |
| CN | 102111287 A | 6/2011 |
| EP | 1343296 A2 | 9/2003 |
| JP | 2002111735 A | 4/2002 |
| JP | 2007158988 A | 6/2007 |
| JP | 2008177714 A | 7/2008 |

OTHER PUBLICATIONS

First Office action issued in corresponding Japan patent application No. 2013-522100, dated Oct. 29, 2013, and an English translation thereof, total 3 pages.

"Solve Net trouble by yourself, Part 3, Wireless LAN surely works if you make full use of wired LAN connection and resetting", Nikkei Personal Computer, No. 483, Jun. 13, 2005, pp. 90-93; total 8 pages.

* cited by examiner

*Primary Examiner* — Adnan Mirza
(74) *Attorney, Agent, or Firm* — Huawei Technologies Co., Ltd.

(57) ABSTRACT

Embodiments of the present invention provide an access control method, an access control system, and an access terminal. The method includes: receiving, by an access terminal, an HTTP request message transmitted by a UE where a destination IP address is an IP address of the access terminal; obtaining an actual IP address corresponding to a website domain name according to DNS resolution when the website domain name is not the IP address of the access terminal, and controlling, according to the actual IP address, the UE to access a target site corresponding to the website domain name. The technical solutions of the present invention solve the problem that a user cannot access the target site because of the cache characteristic of the user equipment.

15 Claims, 5 Drawing Sheets

ACCESS CONTROL METHOD AND SYSTEM AND ACCESS TERMINAL

CROSS-REFERENCE TO RELATED APPLICATIONS

This application is a continuation of International Application No. PCT/CN2012/076070 filed on May 25, 2012, which is hereby incorporated by reference in their entireties.

FIELD OF THE INVENTION

The present invention relates to network communication technologies, and in particular, to an access control method, an access control system, and an access terminal.

BACKGROUND OF THE INVENTION

A user equipment (User Equipment, UE) usually accesses a network through an access terminal such as a router, a wireless router, or a wireless network card. After a user inputs a website domain name in a browser on the user equipment, the browser queries a local cache. If an Internet Protocol (Internet Protocol, IP) address of a target site corresponding to the website domain name exists in the local cache, a Hypertext Transport Protocol (Hypertext Transport Protocol, HTTP) request is directly initiated through the access terminal to the target site; and if the IP address of the site corresponding to the website domain name does not exist in the local cache, a domain name system (Domain Name System, DNS) query request is generated and transmitted to the access terminal. The access terminal performs DNS resolution, obtains the IP address of the target site corresponding to the website domain name from an external DNS server, and returns the IP address to the browser, the browser caches correspondence between the website domain name and the IP address of the target site, the HTTP request is initiated through the access terminal to the target site, and finally, web page content of the target site is displayed to the user.

In the foregoing process, if the user equipment is not connected to the network, the access terminal does not obtain the IP address of the target site from the DNS server, and the access terminal uses the IP address of the access terminal as a DNS resolution result and returns the DNS resolution result to the browser, and redirects the user to a Web management page of the access terminal through the browser, so as to provide a dialup access function for the user equipment. In the process, the browser caches the correspondence between the website domain name and the IP address of the access terminal. After the user equipment can access the Internet, the user inputs an original website domain name in the browser on the user equipment, the browser does not initiate the DNS resolution again, but directly uses the IP address of the corresponding access terminal in the cache to initiate the HTTP request, so the user sees the Web management page of the access terminal again, causing that the user cannot access the target site.

SUMMARY OF THE INVENTION

Embodiments of the present invention provide an access control method, an access control system, and an access terminal, so as to solve the problem that a user cannot access a target site.

In one aspect, an embodiment of the present invention provides an access control method, which includes:

receiving, by an access terminal, a Hypertext Transport Protocol HTTP request message transmitted by a user equipment wherein a destination Internet Protocol IP address is an IP address of the access terminal, where the HTTP request message includes a website domain name;

obtaining, by the access terminal, an actual IP address corresponding to the website domain name according to domain name system DNS resolution when the website domain name is not a first domain name, where the first domain name is a domain name corresponding to the IP address of the access terminal; and controlling, by the access terminal, the user equipment to access a target site corresponding to the website domain name according to the actual IP address.

In another aspect, an embodiment of the present invention provides an access terminal, which includes:

a receiver, configured to receive a Hypertext Transport Protocol HTTP request message transmitted by a user equipment wherein a destination Internet Protocol IP address is an IP address of the access terminal, where the HTTP request message includes a website domain name; and a processor, configured to obtain an actual IP address corresponding to the website domain name according to domain name system DNS resolution when the website domain name is not a first domain name, and control, according to the actual IP address, the user equipment to access a target site corresponding to the website domain name, where the first domain name is a domain name corresponding to the IP address of the access terminal.

In another aspect, an embodiment of the present invention provides an access control system, which includes a user equipment, an access terminal, and a domain name system DNS server, wherein the user equipment is configured to transmit a Hypertext Transport Protocol HTTP request message to the access terminal where a destination Internet Protocol IP address is an IP address of the access terminal, where the HTTP request message includes a website domain name;

the access terminal includes:

a receiver, configured to receive the HTTP request message transmitted by the user equipment; and a processor, configured to obtain an actual IP address corresponding to the website domain name according to domain name system DNS resolution when the website domain name is not a first domain name, and control, according to the actual IP address, the user equipment to access a target site corresponding to the website domain name, where the first domain name is a domain name corresponding to the IP address of the access terminal; and the DNS server is configured to perform the DNS resolution.

In the access control method, the access control system, and the access terminal provided by the embodiments of the present invention, the access terminal, after receiving the HTTP request message wherein the destination IP address is the IP address of the access terminal, by comparing the website domain name in the HTTP request message with the domain name corresponding to the IP address of the access terminal, determines the validity of the HTTP request message; and when determining that the HTTP request message is invalid, obtains the actual IP address corresponding to the website domain name according to the DNS resolution and controls, according to the obtained actual IP address, the user equipment to access the target site corresponding to the website domain name, so as to enable the user equipment to successfully access the target site corresponding to the website domain name. In this way, the following problem is solved: after the website domain name is input in the browser on the user equipment, the user cannot access the target site because of the characteristic that the browser caches the IP address returned by the access terminal.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art can derive other drawings from these accompanying drawings without creative efforts.

DETAILED DESCRIPTION OF THE EMBODIMENTS

Figure 1A:
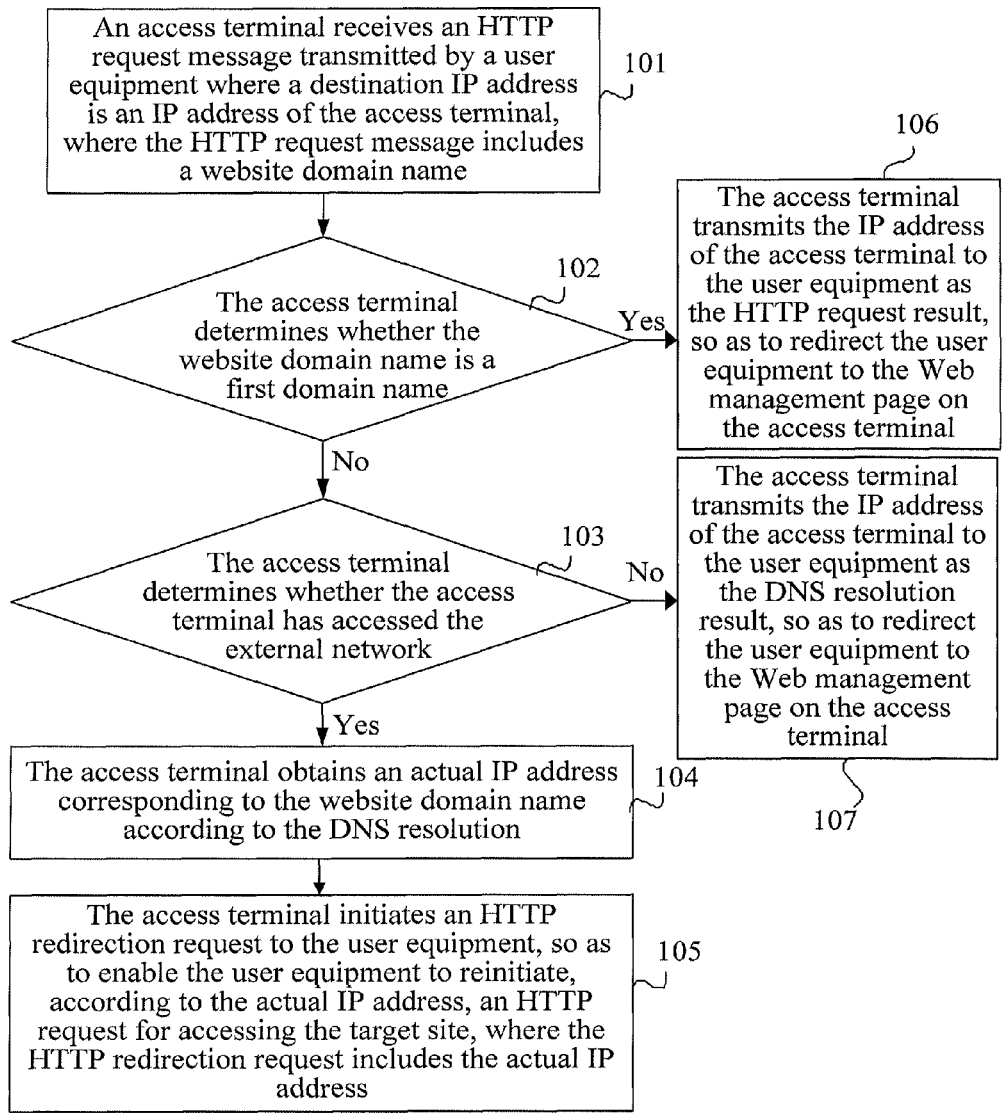
FIG. 1A is a flow chart of an access control method according to an embodiment of the present invention.

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

It is noted first that in the following embodiments of the present invention, a user equipment includes but is not limited to: a personal computer (Personal Computer, PC), a laptop computer, an IPAD, or a smart phone.

In the following embodiments of the present invention, an access terminal may be, but not limited to, a router, a wireless router, or a wireless network card (for example, a USB modem).

It is noted here that in the following embodiments of the present invention, operations performed by the user equipment may be specifically performed by a browser on the user equipment, but is not limited here.

An embodiment of the present invention provides an access control method. In this embodiment of the present invention, the access control method mainly includes:

An access terminal receives an HTTP request message transmitted by a user equipment where a destination IP address is an IP address of the access terminal, where the HTTP request message includes a website domain name. The website domain name may be a domain name input by a user in a browser on the user equipment and is used for accessing a target site corresponding to the website domain name.

When the website domain name in the HTTP request message is not a first domain name, the access terminal obtains an actual IP address corresponding to the website domain name in the HTTP request message according to DNS resolution; and then the access terminal controls, according to the obtained actual IP address, the user equipment to access the target site corresponding to the website domain name. The first domain name is a domain name corresponding to the IP address of the access terminal. The actual IP address refers to an IP address of the target site corresponding to the website domain name. The website domain name in the HTTP request message is not the first domain name, and specifically, the access terminal, after receiving the HTTP request message, determines whether the website domain name in the HTTP request message is the first domain name. That is, the access terminal determines whether the website domain name in the HTTP request message is the domain name corresponding to the IP address of the access terminal. Specifically, the access terminal parses the HTTP request message, obtains the website domain name from the HTTP request message, and then compares the obtained website domain name with the domain name corresponding to the IP address of the access terminal, and determines whether the obtained website domain name is the domain name corresponding to the IP address of the access terminal. The access terminal locally stores the domain name corresponding to the IP address of the access terminal.

Optionally, the process in which the access terminal obtains the actual IP address corresponding to the website domain name according to the DNS resolution may be as follows: the access terminal transmits a DNS resolution request to a DNS server in an external network, so as to enable the DNS server to perform the DNS resolution on the website domain name and returns a DNS resolution result, where the DNS resolution request includes the website domain name, that is, the DNS resolution request may be used for querying the actual IP address corresponding to the website domain name; and the access terminal receives the actual IP address corresponding to the website domain name returned by the DNS server after the DNS server performs the DNS resolution on the website domain name. The DNS server refers to a server which saves the correspondence between website domain names corresponding to all sites and IP addresses in the network, and has a function of converting a website domain name into a corresponding IP address.

Based on the above, before the access terminal transmits the DNS resolution request to the DNS server, an optional step may be further included: the access terminal determines whether the access terminal has accessed the external network. Specifically, the access terminal records a state indicates whether the access terminal has accessed the external network, and the access terminal can determine whether the access terminal has accessed the external network according to the recorded state. For example, an access mark is set on the access terminal, and the access mark is used for identifying whether the access terminal has accessed the external network; after the access terminal has accessed the external network, the access mark is set to 1; and when the access terminal has not accessed the external network, the access mark is set to 0. Based on that, the access terminal determines whether the access terminal has accessed the external network according to a value of the access mark. The value of the access value is not limited to 0 and 1.

When a determination result is that the access terminal has accessed the external network, the access terminal transmits the DNS resolution request to the DNS server in the external network.

The external network may be a network enabling the access terminal to connect to a network, for example, the external network may be a fixed network, wireless mobile network (for example, a 3G network and an LTE network), WiFi network or Zigbee network, and may also be the Internet accessed through the fixed network, mobile network, WiFi network, or Zigbee network.

It is noted here that, in this embodiment of the present invention, the access terminal usually has a local area network (Local Area Network, LAN) IP address (which may be referred to as an in-network IP address) and a wide area network (Wide Area Network, WAN) IP address (which may be referred to as an out-of-network IP network). The WAN IP address can be obtained by converting the LAN IP address. In this embodiment of the present invention, the IP address of the access terminal may be an LAN IP address of the access terminal.

In this embodiment, the access terminal, after receiving the HTTP request message where the destination IP address is the IP address of the access terminal, by comparing the website domain name in the HTTP request message with the domain name corresponding to the IP address of the access terminal, determines the validity of the HTTP request message; and when the access terminal determines that the website domain name in the HTTP request message is not the domain name corresponding to the IP address of the access terminal, it means that the HTTP request message is transmitted by the user equipment using the cached IP address of the access terminal as the actual IP address corresponding to the website domain name, and therefore is an invalid request. In this embodiment, based on the determination result, the access terminal obtains the actual IP address corresponding to the website domain name in the HTTP request message according to the DNS resolution, and then based on the obtained actual IP address, controls the user equipment to access the target site corresponding to the website domain name in the HTTP request message. In this way, the following problem is solved: after the website domain name is input in the browser on the user equipment, the user cannot access the target site because of the characteristic that the browser caches the IP address of the access terminal.

In addition, in the case that the user equipment is set with cache expiration time, by using the access control method provided by this embodiment, the user can successfully access the target site corresponding to the website domain name without waiting the correspondence, cached by the user equipment, between the IP address of the access terminal and the website domain name to expire, thereby improving an efficiency for accessing the target site. In the case that, for the user equipment: the cached correspondence between the IP address of the access terminal and the website domain name can be cleared by closing and restarting the browser on the user equipment, by using the access control method provided by this embodiment, the user can successfully access the target site corresponding to the website domain name without closing the browser on the user equipment, thereby improving the efficiency for accessing the target site. It is noted here that, in the case that the user equipment is set with the cache expiration time, when the cache expiration time does not arrive, the target site cannot be successfully accessed though the user closes the browser on the user equipment, however, by using the access control method provided in this embodiment, the user can successfully access the target site corresponding to the website domain name neither needing to close and restart the browser on the user equipment nor needing to wait the cache time to expire, thereby improving the efficiency for accessing the target site.

Furthermore, when the website domain name in the HTTP request message is the first domain name, that is, the website domain name in the HTTP request message is the domain name corresponding to the IP address of the access terminal, it means that the HTTP request message is a request used for the user equipment to request access to the Web management page on the access terminal, and therefore, the access terminal transmits a DNS reply packet to the user equipment, so as to redirect the user equipment to the Web management page on the access terminal, where the DNS reply packet includes the IP address of the access terminal. In this case, after the user equipment is redirected to the Web management page on the access terminal, the user can perform operations such as dialing, device management, and/or parameter configuration on the user equipment through the Web management page on the access terminal according to an actual application requirement.

Furthermore, in the case that the website domain name in the HTTP request message is not the first domain name, if the access terminal determines that the access terminal has not accessed the external network, at this time, the DNS resolution request transmitted by the access terminal cannot reach the DNS server in the external network, and the actual IP address corresponding to the website domain name cannot be obtained. Therefore, the access terminal can use the IP address of the access terminal as the DNS resolution result and encapsulate it in the DNS reply packet, and transmit the DNS reply packet to the user equipment so as to redirect the user equipment to the Web management page on the access terminal. In this case, after the user equipment is redirected to the Web management page on the access terminal, the user equipment can perform a dialing operation by accessing the Web management page on the access terminal, so as to enable the access terminal to access the external network. It is noted that the dialing operation described here refers to an operation of executing access to an external network, and a result may include successfully accessing the external network and failing to access the external network.

Optionally, an implementation manner for the access terminal to control, according to the obtained actual IP address, the user equipment to access the target site corresponding to the website domain name may be as follows: the access terminal initiates an HTTP redirection request to the user equipment, so as to enable the user equipment to reinitiate, according to the actual IP address corresponding to the website domain name, an HTTP request for accessing the target site, where the HTTP redirection request includes the actual IP address.

Optionally, an implementation manner for the access terminal to initiate the HTTP redirection request to the user equipment may be as follows: the access terminal transmits an HTTP redirection request packet to the user equipment.

Preferably, the access terminal may place the actual IP address in a header (Header) field of the HTTP redirection packet, for example, in a location (Location) field, but is not limited here.

The HTTP redirection packet may be a response code of an HTTP30x series. According to different operation systems or browser types of the user equipment, the HTTP redirection packet may be, but not limited to, an HTTP response code 300 (multiple choices), an HTTP response code 301 (moved permanently), an HTTP response code 302 (found), an HTTP response code 303 (see other), or an HTTP response code 307 (temporary redirect).

Optionally, an implementation manner for the access terminal to transmit the HTTP redirection request to the user equipment may be as follows: the access terminal transmits an HTTP redirection page to the user equipment, where the redirection page includes the actual IP address.

The redirection page is generally a prompting page, which, except including the actual IP address, generally further includes link information pointing to the actual IP address. The link information pointing to the actual IP address may be a browser client script or a plug-in in the redirection page. The script or plug-in may include but not limited to: Javascript, VBScript, or Flash. The script or plug-in in the redirection page can prompt the user to click or directly control the user equipment to initiate the HTTP request to the actual IP address. For example, in the Javascript, an implementation structure of the link information pointing to the actual IP address may be: window. location. href="http://[actual IP address]".

Usually, lengths of the cache expiration time of different user equipments are different, the common is 1 to 3 minutes, a good ten-minute, and so on, and it is long for the user to access the target site by waiting for the time of the length. Operations of closing and restarting the browser on the user equipment are cumbersome, and a manual operation generally has a low efficiency, which also affects the efficiency for the user to access the target site. In this embodiment of the present invention, after the user equipment receives the HTTP redirection request packet or page returned by the access terminal, the HTTP request for accessing the target site can be directly initiated according to the actual IP address in the HTTP redirection request packet or page, so it is neither required to wait the cached correspondence between the website domain name and the IP address of the access terminal to expire, nor required to close the browser on the user equipment, thereby improving the efficiency for successfully accessing the target site.

Optionally, another implementation manner for the access terminal to control, according to the obtained actual IP address, the user equipment to access the target site corresponding to the website domain name may be as follows: the access terminal replaces the destination IP address of the received HTTP request message with the actual IP address and transmits the actual IP address, so as to enable the user equipment to access the target site corresponding to the website domain name. The process in which the access terminal replaces the destination IP address of the received HTTP request message with the actual IP address and transmits the actual IP address, so as to enable the user equipment to access the target site corresponding to the website domain name may be as follows: the access terminal replaces the destination IP address of the received HTTP request message with the actual IP address and transmits the actual IP address to the target site corresponding to the website domain name, so as to enable the user equipment to access the target site corresponding to the website domain name.

In the implementation manner, the access terminal, after obtaining the actual IP address corresponding to the website domain name, replaces the IP address of the access terminal in the HTTP request message with the actual IP address and transmits the actual IP address, so that the user equipment is also enabled to successfully access the target site corresponding to the website domain name, and the user equipment neither needs to wait the cached correspondence between the website domain name and the IP address of the access terminal to expire, nor needs to close and restart the browser on the user equipment, thereby improving the efficiency for successfully accessing the target site.

FIG. 1A is a flow chart of an access control method according to an embodiment of the present invention. As shown in FIG. 1A, the method of this embodiment includes the following steps:

Step 101: An access terminal receives an HTTP request message transmitted by a user equipment where a destination IP address is an IP address of the access terminal, where the HTTP request message includes a website domain name.

The website domain name is a domain name of a target site a user needs to access, which may be input by the user in a browser on the user equipment. The destination IP address is the IP address of the access terminal.

Specifically, when the user needs to access a site (recorded as the target site), the user inputs the website domain name of the target site in the browser on the user equipment. The user equipment queries cached correspondence between a locally website domain name and an IP address according to the website domain name input by the user, obtains an IP address corresponding to the website domain name, and then generates an HTTP request message.

The destination IP address in the HTTP request message is an IP address in the correspondence, cached by the user equipment, between the website domain name and the IP address of the access terminal. The HTTP request message further includes the website domain name. Preferably, the user equipment may place the website domain name in a host (Host) field or referrer (Referrer) field of a header of the HTTP request message, but is not limited here. For example, the website domain name may be carried through other fields except the Host field or Referrer field.

In this embodiment, the IP address in the correspondence, cached by the user equipment, between the website domain name and the IP address is the IP address of the access terminal. Optionally, if the access terminal, before receiving the HTTP request message transmitted by the user equipment, receives a DNS resolution request transmitted by the user equipment, and the access terminal has not accessed an external network, the access terminal uses the IP address of the access terminal as a DNS resolution result and returns the DNS resolution result to the user equipment.

Persons of ordinary skill in the art can understood that the HTTP request message transmitted by the user equipment carries an identifier of the user equipment, so as to enable the access terminal to distinguish different user equipments.

Step 102: The access terminal determines whether the website domain name is a first domain name; where when a determination result is no, perform step 103; and when the determination result is yes, perform step 106.

The first domain name is a domain name corresponding to the IP address of the access terminal. The access terminal locally stores a domain name corresponding to the IP address of the access terminal, that is, the access terminal locally stores the first domain name.

The access terminal, after receiving the HTTP request message where the destination IP address is the IP address of the access terminal, parses the HTTP request message, obtains a website domain name (that is, the domain name of the target site the user requests to access) from the HTTP request message, and then compares the website domain name obtained from the HTTP request message with the domain name corresponding to the IP address of the access terminal, so as to determine whether the HTTP request message is a valid request.

If the determination result is yes, that is, the access terminal determines that the website domain name obtained from the HTTP request message is the domain name corresponding to the IP address of the access terminal, it means that the HTTP request message is valid, and the HTTP request message is a request used by the user equipment to access the Web management page on the access terminal, so the access terminal performs step 106, that is, the IP address of the access terminal is transmitted to the user equipment as an HTTP request result, so as to redirect the user equipment to the Web management page on the access terminal.

If the determination result is no, that is, the access terminal determines that the domain name obtained from the HTTP request message is not the domain name corresponding to the IP address of the access terminal, it means that the HTTP request message is transmitted by the user equipment using the IP address of the access terminal as an actual IP address of the website domain name, and is an invalid request, so the access terminal performs step 103, that is, it is further determined whether the access terminal has accessed an external network, so as to determine whether DNS resolution can be performed to obtain an actual IP address for the website domain name.

Step 103: The access terminal determines whether the access terminal has accessed the external network; where when a determination result is yes, perform step 104; and when the determination result is no, perform step 107.

In this embodiment, the access terminal records a state indicates whether the access terminal has accessed the external network. The access terminal can determine whether the access terminal has accessed the external network according to the recorded state. For example, an access mark is set on the access terminal, and the access mark is used for identifying whether the access terminal has accessed the external network; after the access terminal has accessed the external network, the access mark is set to 1; and when the access terminal has not accessed the external network, the access mark is set to 0. Based on that, the access terminal determines whether the access terminal has accessed the external network according to a value of the access mark. The value of the access value is not limited to 0 and 1.

In the case that the website domain name is not the domain name corresponding to the IP address of the access terminal, if the access terminal determines that the access terminal has accessed the external network, the access terminal performs step 104, that is, the DNS resolution is performed to obtain the actual IP address for the website domain name; and if the access terminal determines that the access terminal has not accessed the external network, the access terminal performs step 107, that is, the IP address of the access terminal is transmitted to the user equipment as a DNS resolution result, so as to redirect the user equipment to the Web management page on the access terminal, so that the user equipment performs an operation such as a dialup access.

Step 104: The access terminal obtains an actual IP address corresponding to the website domain name according to the DNS resolution.

Specifically, the access terminal transmits a DNS resolution request to a DNS server in the external network, where the DNS resolution request includes the website domain name. The DNS server receives the DNS resolution request transmitted by the access terminal, parses the DNS resolution request and obtains the website domain name therein, and then performs the DNS resolution on the website domain name, obtains the actual IP address corresponding to the website domain name, and then transmits a DNS reply packet to the access terminal, where the DNS reply packet includes the obtained actual IP address. The access terminal receives the DNS reply packet returned by the DNS server, and obtains the actual IP address corresponding to the website domain name from the DNS reply packet.

Step 105: The access terminal initiates an HTTP redirection request to the user equipment, so as to enable the user equipment to reinitiate, according to the actual IP address, an HTTP request for accessing the target site, where the HTTP redirection request includes the actual IP address.

In an optional implementation manner in this embodiment, the access terminal may transmit an HTTP redirection packet to the user equipment, and carry the actual IP address through a header field of the HTTP redirection packet, which is not limited in this embodiment.

Optionally, the HTTP redirection packet may be, but not limited to, an HTTP response code 300 (multiple choices), an HTTP response code 301 (moved permanently), an HTTP response code 302 (found), an HTTP response code 303 (see other), or an HTTP response code 307 (temporary redirect).

In an optional implementation manner of this embodiment, the access terminal may transmit an HTTP redirection page to the user equipment, and carries the actual IP address through the HTTP redirection page.

Furthermore, the access terminal may further carry link information pointing to the actual IP address in the redirection page, which is used for automatically controlling the user equipment to reinitiate, according to the actual IP address, the HTTP request for accessing the target site. The link information pointing to the actual IP address may be, but not limited to, a browser client script or plug-in in the redirection page.

The script or plug-in may include but not limited to: Javascript, VBScript, or Flash.

After the user equipment receives the actual IP address of the website domain name, the user can directly input the website domain name in the browser on the user equipment, neither needs to wait close the browser on the user equipment nor needs to wait the correspondence, cached by the user equipment, between the IP address of the access terminal and the website domain name to expire, and can reinitiate the HTTP request.

Step 106: The access terminal transmits the IP address of the access terminal to the user equipment as the HTTP request result, so as to redirect the user equipment to the Web management page on the access terminal, and ends the operation.

Step 107: The access terminal transmits the IP address of the access terminal to the user equipment as the DNS resolution result, so as to redirect the user equipment to the Web management page on the access terminal, and ends the operation.

In this embodiment, when the access terminal determines that the HTTP request message where the destination IP address is the IP address of the access terminal is an invalid request, it is further determined whether the access terminal has accessed the external network, and if the access terminal has accessed the external network, the actual IP address corresponding to the website domain name is obtained according to the DNS resolution, enabling the user to reinitiate the HTTP request for accessing the target site neither needing to wait the correspondence, cached by the user equipment, between the IP address of the access terminal and the website domain name to expire, nor needing to close and restart the browser on the user equipment, and thereby improving an efficiency for accessing the target site; and if the access terminal has not accessed the external network, the user equipment is redirected to the Web management page on the access terminal, so as to enable the user performs an operation of accessing the external network in time through the Web management page, thereby facilitating to improve an efficiency for accessing the target site to a certain extent.

Figure 1B:
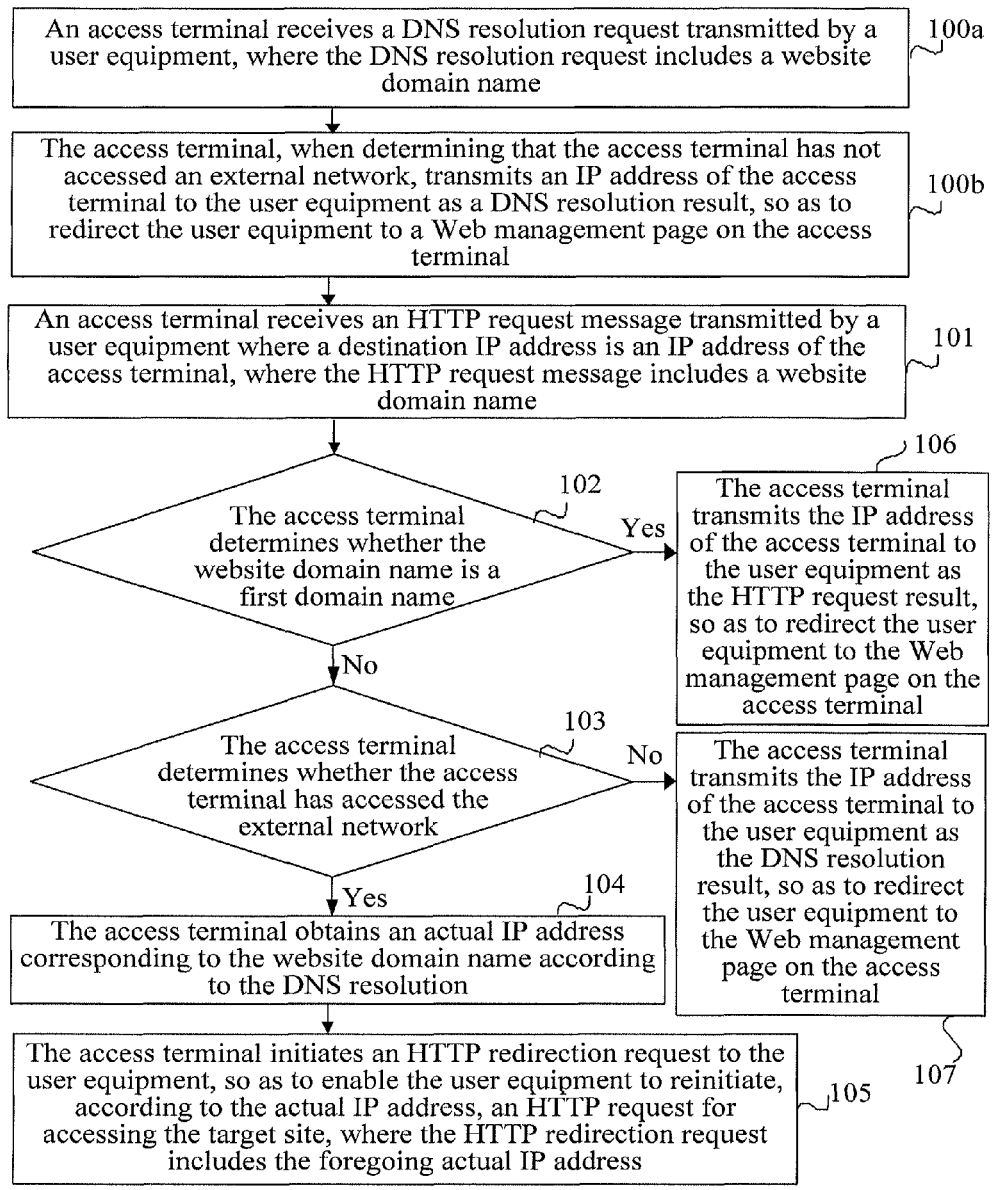
FIG. 1B is a flow chart of an access control method according to another embodiment of the present invention.

FIG. 1B is a flow chart of an access control method according to another embodiment of the present invention. This embodiment may be implemented based on the embodiment shown in FIG. 1A. As shown in FIG. 1B, the method of this embodiment includes the following steps before step 101:

Step 100a: An access terminal receives a DNS resolution request transmitted by a user equipment, where the DNS resolution request includes a website domain name.

Step 100b: The access terminal, when determining that the access terminal has not accessed an external network, transmits an IP address of the access terminal to the user equipment as a DNS resolution result, so as to redirect the user equipment to a Web management page on the access terminal.

In this embodiment, the user equipment has accessed the external network through the access terminal. The access terminal can provide a Web management page for a user. For example, the user can input an IP address of the access terminal (for example, 192. 168. 1. 1) or a domain name (for example, mobilewifi. home) corresponding to the IP address of the access terminal in a browser on the user equipment, so as to access the Web management page on the access terminal. On the Web management page of the access terminal, the user is provided with functions such as a dialing function for accessing the external network, device management, and parameter configuration, so the user can perform operations such as dialing, device management, and parameter configuration through the Web management page on the access terminal.

When the user needs to access a site (recorded as a target site), the user inputs a website domain name in the browser on the user equipment; the user equipment generates a DNS resolution request according to the website domain name input by the user and transmits the DNS resolution request to the access terminal; the access terminal determines whether the access terminal has accessed the external network, and if the access terminal has not accessed the external network currently, the access terminal returns the IP address of the access terminal or a domain name corresponding to the IP address of the access terminal to the user equipment as the DNS resolution result, so as to redirect the user equipment to the Web management page on the access terminal, and on the Web management page of the access terminal, a reason for that the network cannot be accessed is displayed and a function of accessing the external network is provided; and the user performs the dialing through the Web management page on the access terminal, so as to enable the access terminal to access the external network.

In the foregoing process, the user equipment caches the correspondence between the IP address of the access terminal and the website domain name.

In this embodiment, after the access terminal has accessed the external network, the user can directly input the domain name in the browser presenting the Web management page on the user equipment, and at this time, the user equipment queries a local cache, uses the IP address of the access terminal as the actual IP address of the website domain name, and does not initiate the DNS resolution again but performs step 101, that is, generates an HTTP request message and transmits the HTTP request message to the access terminal. The destination IP address of the HTTP request message is the IP address of the access terminal rather than the actual IP address corresponding to the website domain name.

It can be seen that this embodiment solves the following problem: after the user has accessed the external network (for example, dialing) through the Web management page on the access terminal, the user directly inputs the original website domain name in the browser presenting the Web management page on the user equipment but cannot access the target site. In this embodiment, the user can successfully access the target site neither needing to wait the cached correspondence between the website domain name and the IP address of the access terminal to expire, nor needing to close and restart the browser on the user equipment, thereby improving an efficiency for accessing the target site.

This embodiment is further described in combination with an actual application scenario below. Assuming that in the application scenario, a user needs to access a target site of which the website domain name is www. xxxxx. com, a access terminal has not accessed an external network currently, and the state of the access terminal meets a redirection condition, the specific process in which the user has accessed the target site of which the website domain name is www. xxxxx. com is as follows:

Step a: The user inputs the website domain name www. xxxxx. com in the browser on a user equipment, where the website domain name www. xxxxx. com corresponds to the target site the user wants to access.

Step b: The user equipment transmits a DNS resolution request to the access terminal, and the access terminal returns the IP address of the access terminal, for example, 192. 168. 1. 1, to the user equipment as a query result of the DNS.

Step c: The user equipment caches the DNS resolution result, that is, the user equipment considers that an actual IP address corresponding to the website domain name www. xxxxx. com is 192. 168. 1. 1.

Step d: The user equipment initiates an HTTP request to the access terminal, and the Web management page on the access terminal is presented on the browser on the user equipment, and the user performs a dialup access by operating the Web management page.

Step e: The user does not close the browser on the user equipment, and inputs the website domain name www. xxxxx. com again in the browser presenting the Web management page on the user equipment.

Step f: The user equipment queries the local cache, directly uses an IP address of the access terminal 192. 168. 1. 1 as the actual IP corresponding to the website domain name www. xxxxx. com, generates and transmits the HTTP request message, and does not initiate the DNS resolution again.

Step g: The access terminal, after receiving the HTTP request message, determines whether the website domain name of the header of the HTTP request message is the domain name corresponding to the IP address of the access terminal. Assuming that the domain name corresponding to the IP address of the access terminal 192. 168. 1. 1 is www. aaaaa. com, the access terminal determines that the current HTTP request is faulty.

Step h: The access terminal, after determining that the current HTTP request is faulty, continues to determine whether the access terminal has currently gained access to the external network, if the access terminal has not accessed the external network, the access terminal returns the IP address of the access terminal 192. 168. 1. 1 to the user equipment, so as to redirect the user equipment to the Web management page on the access terminal; and if the access terminal has accessed the external network, the DNS server performs the DNS resolution, and obtains the actual IP address of the website domain name www. xxxxx. com.

Step i: The access terminal, after obtaining the actual IP address of the website domain name www. xxxxx. com, constructs an HTTP redirection request, and transmits the actual IP address of the website domain name www. xxxxx. com to the user equipment through the HTTP redirection request.

A specific implementation manner of the HTTP redirection request may be an HTTP redirection packet or redirection page.

Step j: The user equipment retransmits the HTTP request message to the access terminal according to the actual IP address of the website domain name www. xxxxx. com.

Step k: The access terminal, after receiving the HTTP request message, forwards the HTTP request message, and the user equipment finally has accessed the target site corresponding to the website domain name www. xxxxx. com.

Furthermore, it is noted here that the method of this embodiment of the present invention is not only applicable to the redirection application scenario in the process the target site is accessed by using the website domain name, but also applicable to other redirection application scenarios. For example, an application scenario in which the DNS redirection is used to implement a load balance in a fixed network.

The principle for the DNS redirection to implement the load balance is: configuring the same name for multiple IP addresses in the DNS server, so as to enable a client querying the name to obtain one of the addresses, so that different clients access different servers, thereby achieving the objective of the load balance. However, when a server fails, though DNS setting is modified in time, it is still required to wait for enough time (for example, certain renew time) to take effect. In this period, a client which caches an IP address of the faulty server cannot access the server normally, and therefore cannot obtain a required service. Alternatively, when an IP address of a server changes, if it is the original IP address of the server cached in the client, the client cannot access the server either before the IP address of the server is updated. For the foregoing problems, the DNS server may adopt the access control method provided by this embodiment of the present invention, when the DNS resolution request transmitted by the client is received, it is determined whether the IP address of the server in the DNS resolution request is consistent with the cached IP address of the server, or it is determined according to the IP address of the server in the DNS resolution request whether the corresponding server is faulty, and when the determination result is that the IP addresses are inconsistent or the server is faulty, the client is redirected to a normal server, enabling the client to obtain the required service in time.

Figure 2A:
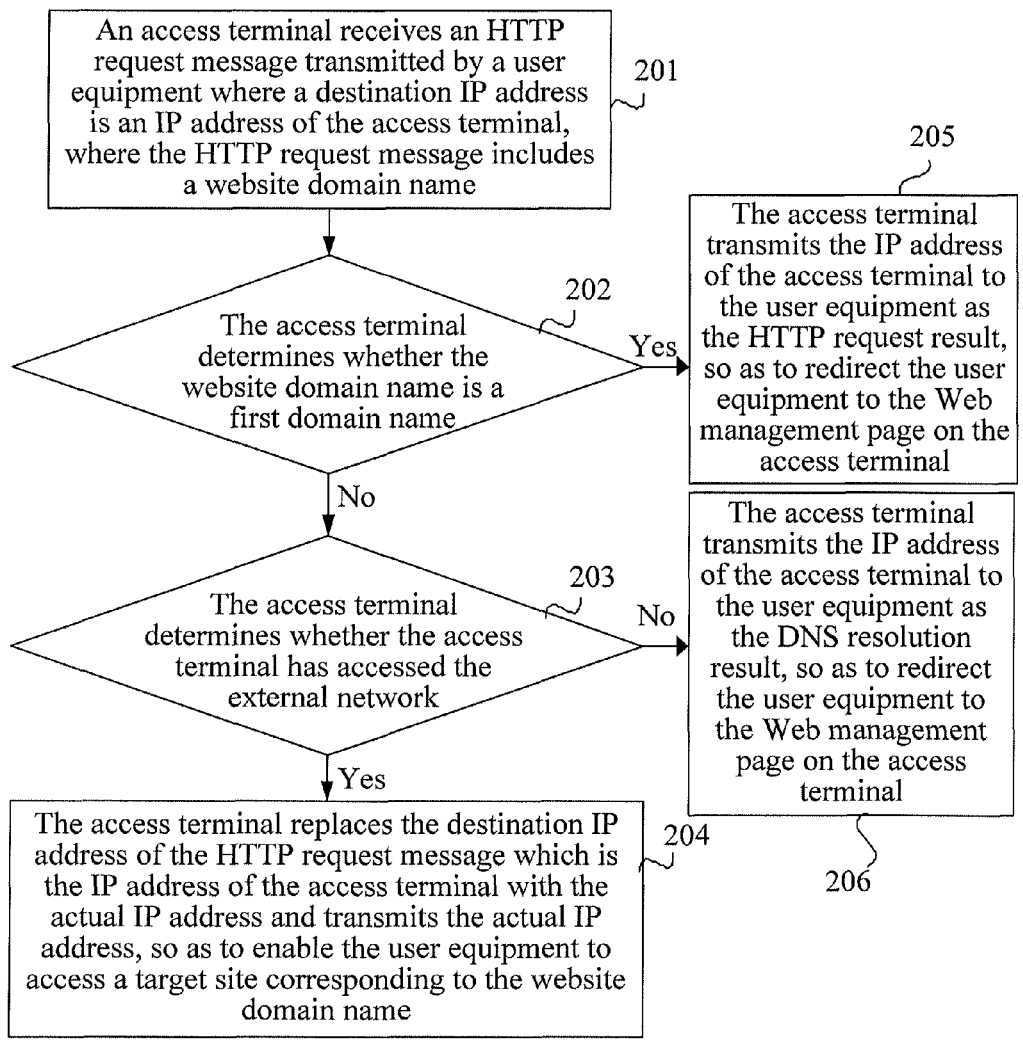
FIG. 2A is a flow chart of an access control method according to another embodiment of the present invention.

FIG. 2A is a flow chart of an access control method according to another embodiment of the present invention. As shown in FIG. 2A, the method of this embodiment includes the following steps:

Step 201: An access terminal receives an HTTP request message transmitted by a user equipment where a destination IP address is an IP address of the access terminal, where the HTTP request message includes a website domain name.

Step 202: The access terminal determines whether the website domain name is a first domain name; where when a determination result is no, perform step 203; and when the determination result is yes, perform step 205.

Step 203: The access terminal determines whether the access terminal has accessed the external network; where when a determination result is yes, perform step 204; and when the determination result is no, perform step 206.

Reference may be made to descriptions of step 101 to step 103 for the step 201 to step 203, and are not described here again.

Step 204: The access terminal replaces the destination IP address of the HTTP request message which is the IP address of the access terminal with the actual IP address and transmits the actual IP address, so as to enable the user equipment to access a target site corresponding to the website domain name.

In this embodiment, when the access terminal determines that the website domain name in the HTTP request message is not a domain name corresponding to the IP address of the access terminal, and the access terminal has accessed the external network, the access terminal directly replaces the destination IP address of the HTTP request message which is the IP address of the access terminal with the actual IP address corresponding to the website domain name in the HTTP request message, and then transmits the HTTP request message of which the destination IP address is replaced, so as to enable the user equipment to successfully access the target site, thereby solving the problem in the prior art that after inputting the website domain name in the browser on the user equipment, the user cannot access the target site corresponding to the website domain name because the browser caches the IP address of the access terminal.

In addition, in the case that the user equipment is set with cache expiration time, by using the access control method provided by this embodiment, the user can successfully access the target site corresponding to the website domain name without waiting the correspondence, cached by the user equipment, between the IP address of the terminal and the website domain name to expire, thereby improving an efficiency for accessing the target site. In the case that the following is set for the user equipment: the cached correspondence between the IP address of the access terminal and the website domain name can be cleared by closing and restarting the browser on the user equipment, by using the access control method provided by this embodiment, the user can successfully access the target site corresponding to the website domain name without closing the browser on the user equipment, thereby improving the efficiency for accessing the target site. It is noted here that, in the case that the cache expiration time is set for the user equipment, when the cache expiration time does not arrive, the target site cannot be successfully accessed though the user closes and restarts the user equipment, however, by using the access control method provided in this embodiment, the user can successfully access the target site corresponding to the website domain name neither needing to close and restart the browser on the user equipment nor needing to wait the cache time to expire, thereby improving the efficiency for accessing the target site.

Step 205: The access terminal transmits the IP address of the access terminal to the user equipment as the HTTP request result, so as to redirect the user equipment to the Web management page on the access terminal, and ends the operation.

Step 206: The access terminal transmits the IP address of the access terminal to the user equipment as the DNS resolution result, so as to redirect the user equipment to the Web management page on the access terminal, and ends the operation.

Reference may be made to descriptions of step 206 to step 207 for the step 205 to step 206, and are not described here again.

Figure 2B:
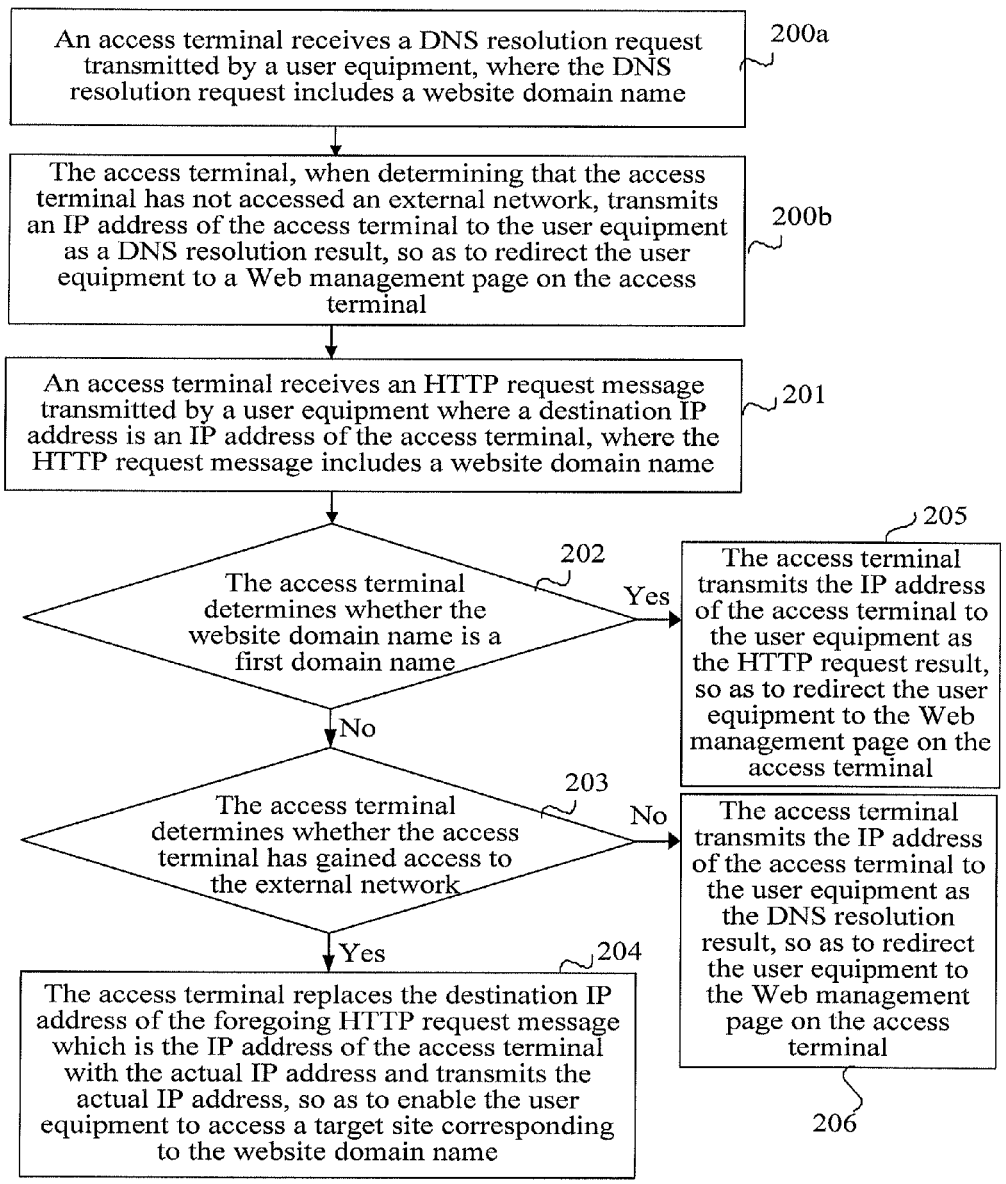
FIG. 2B is a flow chart of an access control method according to another embodiment of the present invention.

FIG. 2B is a flow chart of an access control method according to another embodiment of the present invention. This embodiment is implemented based on the embodiment shown in FIG. 2A, and as shown in FIG. 2B, the method of this embodiment includes the following steps before step 201:

Step 200a: An access terminal receives a DNS resolution request transmitted by a user equipment, where the DNS resolution request includes a website domain name.

Step 200b: The access terminal, when determining that the access terminal has not accessed an external network, transmits an IP address of the access terminal to the user equipment as a DNS resolution result, so as to redirect the user equipment to a Web management page on the access terminal.

Reference may be made to descriptions of step 100*a* to step 100*b* for the step 200*a* to step 200*b*, and are not described here again.

It can be seen that this embodiment solves the following problem: after the user has accessed the external network through the Web management page on the access terminal, the user directly inputs the original website domain name in the browser presenting the Web management page on the user equipment but cannot access the target site. In this embodiment, the user can successfully access the target site neither needing to wait the cached correspondence between the website domain name and the IP address of the access terminal to expire, nor needing to close and restart the browser on the user equipment, thereby improving an efficiency for accessing the target site.

Figure 3A:
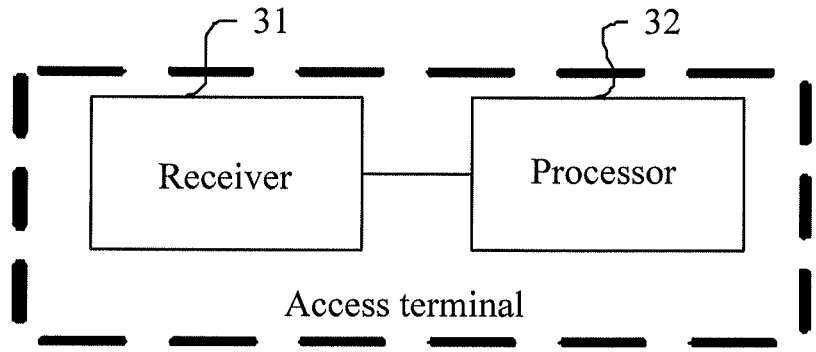
FIG. 3A is a schematic structural diagram of an access terminal according to an embodiment of the present invention.

FIG. 3A is a schematic structural diagram of an access terminal according to an embodiment of the present invention. As shown in FIG. 3A, an access terminal of this embodiment includes a receiver 31 and a processor 32.

The receiver 31 is configured to receive an HTTP request message transmitted by a user equipment where a destination IP address is an IP address of the access terminal, where the HTTP request message includes a website domain name.

The processor 32 is connected to the receiver 31, and is configured to obtain an actual IP address corresponding to the website domain name according to DNS resolution when the website domain name in the HTTP request message received by the receiver 31 is not a first domain name, and control, according to the actual IP address, the user equipment to access a target site corresponding to the website domain name. The first domain name is a domain name corresponding to the IP address of the access terminal.

It is determined that the website domain name in the HTTP request message received by the receiver 31 is not the first domain name. Specifically, the processor 32 can parse the HTTP request message, obtain the website domain name from the HTTP request message, and then compare the obtained website domain name with a domain name corresponding to the IP address of the access terminal, and determine whether the obtained website domain name is the domain name corresponding to the IP address of the access terminal. The access terminal locally stores the domain name corresponding to the IP address of the access terminal.

The access terminal provided by this embodiment can be used to execute the process of the foregoing access control method embodiment, and the specific working principle is described in the method embodiments, and is not described here again.

It is noted here that, the access terminal of this embodiment may further include components such as a power module, an input and output interface, and a memory in addition to the receiver and the processor. The processor may be a central processing unit (Central Processing Unit, CPU), and for convenience of the illustration, the components are not shown in figures.

In this embodiment, the access terminal, after receiving the HTTP request message where the destination IP address is the address of the access terminal, by comparing the website domain name in the HTTP request message with the domain name corresponding to the IP address of the access terminal, determines the validity of the HTTP request message; and when determining that the website domain name is not the domain name corresponding to the IP address of the access terminal, determines that the HTTP request message is transmitted by the user equipment using the IP address of the access terminal as the actual IP address of the website domain name and is an invalid request, and therefore the access terminal obtains the actual IP address corresponding to the website domain name according to the DNS resolution, and controls, according to the actual IP address, the user equipment to access the target site corresponding to the website domain name, so as to enable the user equipment to successfully access the target site corresponding to the website domain name. In this way, the following problem is solved: after inputting the website domain name in the browser on the user equipment, the user cannot access the target site corresponding to the website domain name because of the characteristic that the browser caches the IP address of the access terminal. In addition, in this embodiment, the access terminal can enable the user to successfully access the target site corresponding to the website domain name neither needing to wait the correspondence, cached by the user equipment, between the IP address of the access terminal and the website domain name to expire, nor needing to close and restart the browser on the user equipment, thereby improving an efficiency for accessing the target site.

Figure 3B:
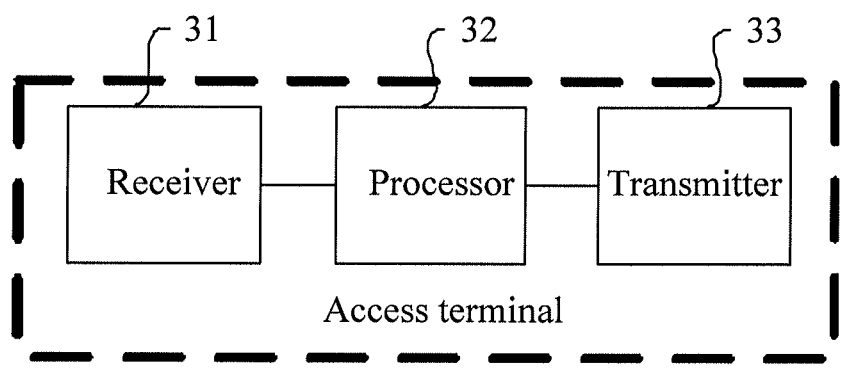
FIG. 3B is a schematic structural diagram of an access terminal according to another embodiment of the present invention.

FIG. 3B is a schematic structural diagram of an access terminal according to another embodiment of the present invention. This embodiment is implemented base on the embodiment shown in FIG. 3A, and as shown in FIG. 3B, the access terminal of this embodiment further includes a transmitter 33.

In this embodiment, the process in which the processor 32 controls, according to the actual IP address, the user equipment to access the target site corresponding to the website domain name includes as follows: the processor 32 is configured to replace the destination IP address of the HTTP request message which is the IP address of the access terminal with the actual IP address obtained by the processor 32, where the HTTP request message is received by the receiver 31, and control the transmitter 33 to transmit the HTTP request message of which the destination IP address is replaced, so as to enable the user equipment to access the target site corresponding to the website domain name.

Correspondingly, the transmitter 33 is connected to the processor 32, and is configured to transmit the HTTP request message of which the destination IP address is replaced under the control of the processor 32.

In addition, in this embodiment, the process in which the processor controls, according to the actual IP address, the user equipment to access the target site corresponding to the website domain name includes as follows: the processor 32 is configured to control the transmitter 33 to transmit an HTTP redirection request to the user equipment, so as to enable the user equipment to reinitiate, according to the actual IP address obtained by the processor 32, an HTTP request for accessing the target site. The HTTP redirection request includes the actual IP address.

The processor 32 may specifically be configured to control the transmitter 33 to initiate the HTTP redirection request to the user equipment, so as to enable the user equipment to reinitiate, according to the actual IP address obtained by the processor 32, the HTTP request for accessing the target site, so as to achieve the objective of controlling the user equipment to access the target site corresponding to the website domain name.

Optionally, the transmitter 33 may specifically be configured to transmit an HTTP redirection request packet or an HTTP redirection page to the user equipment. The HTTP redirection request packet or the HTTP redirection page includes the actual IP address.

Furthermore, the transmitter 33 may be further configured to transmit a DNS reply packet to the user equipment under the control of the processor 32 when the website domain name is the first domain name, so as to redirect the user equipment to the Web management page of the access terminal, where the DNS reply packet includes the IP address of the access terminal.

The access terminal provided by this embodiment can be used to execute the process of the foregoing access control method embodiment, and the specific working principle is described in the method embodiments, and is not described here again.

In this embodiment, the access terminal, after receiving the HTTP request message where the destination IP address is the IP address of the access terminal, by comparing the website domain name in the HTTP request message with the domain name corresponding to the IP address of the access terminal, determines the validity of the HTTP request message; and when determining that the website domain name is not the domain name corresponding to the IP address of the access terminal, determines that the HTTP request message is transmitted by the user equipment using the IP address of the access terminal as the actual IP address of the website domain name and is an invalid request, and therefore the access terminal obtains the actual IP address corresponding to the website domain name according to the DNS resolution, and controls, according to the actual IP address corresponding to the website domain name, the user equipment to access the target site corresponding to the website domain name, so as to enable the user equipment to successfully access the target site corresponding to the website domain name. In this way, the following problem is solved: after inputting the website domain name in the browser on the user equipment, the user cannot access the target site corresponding to the website domain name because of the characteristic that the browser caches the IP address of the access terminal. In addition, in this embodiment, the access terminal can enable the user equipment to successfully access the target site corresponding to the website domain name in the case that the access terminal does not need to wait the correspondence, cached by the user equipment, between the IP address of the access terminal and the website domain name to expire, and does not need to close and restart the browser on the user equipment, thereby improving an efficiency for accessing the target site.

Figure 4:
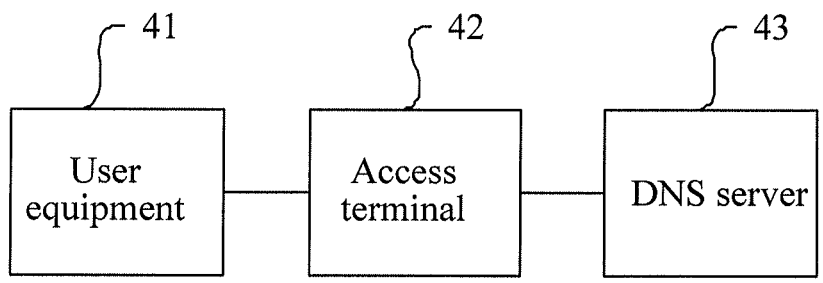
FIG. 4 is a schematic structural diagram of an access control system according to an embodiment of the present invention.

FIG. 4 is a schematic structural diagram of an access control system according to an embodiment of the present invention. As show in FIG. 4, a system of this embodiment includes: a user equipment 41, an access terminal 42, and a DNS server 43.

The user equipment 41 is configured to transmit an HTTP request message where a destination IP address is an IP address of the access terminal to the access terminal 42, where the HTTP request message includes a website domain name.

The access terminal 42 in this embodiment includes a receiver and a processor.

The receiver is configured to receive the HTTP request message transmitted by the user equipment 41. The processor is connected to the receiver, and is configured to obtain an actual IP address corresponding to the website domain name according to DNS resolution when the website domain name in the HTTP request message received by the receiver is not a first domain name, and control, according to the actual IP address, the user equipment to access a target site corresponding to the website domain name. The first domain name is a domain name corresponding to the IP address of the access terminal.

Optionally, the access terminal 42 in this embodiment may further include a transmitter.

The DNS server 43 is configured to perform the DNS resolution. Optionally, the process in which the DNS server 43 performs the DNS resolution may include: receiving a DNS resolution request transmitted by the processor of the access terminal 42, where the DNS resolution request includes the website domain name in the HTTP request message. The DNS server 43 performs the DNS resolution on the website domain name in the DNS resolution request, obtains the actual IP address corresponding to the website domain name, and then returns the obtained actual IP address to the processor of the access terminal 42 as a DNS resolution result.

Optionally, the user equipment 41 is connected to the receiver of the access terminal 42, and the DNS server 43 is connected to the processor of the access terminal 42.

It is noted here that, reference may be made to the description of the embodiment shown in FIG. 3A for a structure of the access terminal 42 in this embodiment, and reference may be made to the description of the foregoing method embodiments for the working principle, which are not described here again.

In the access control system of this embodiment, the access terminal, after receiving the HTTP request message where the destination IP address is the address of the access terminal, by comparing the website domain name in the HTTP request message with the domain name corresponding to the IP address of the access terminal, determines the validity of the HTTP request message; and when determining that the website domain name is not the domain name corresponding to the IP address of the access terminal, determines that the HTTP request message is transmitted by the user equipment using the IP address of the access terminal as the actual IP address of the website domain name and is an invalid request, and the access terminal further obtains the actual IP address corresponding to the website domain name, and controls, according to the actual IP address, the user equipment to access the target site corresponding to the website domain name, so as to enable the user equipment to access the target site corresponding to the website domain name, and the user can successfully access the target site in the case that the user equipment does not need to wait the correspondence, cached by the user equipment, between the IP address and the website domain name to expire and does not need to close and restart the browser on the user equipment, thereby improving an efficiency for accessing the target site.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as ROM, RAM, magnetic disk, or optical disk, and like.

Finally, it should be noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments, or make equivalent substitutions to some or all the technical features thereof, without departing from the scope of the technical solutions of the embodiments of the present invention.

What is claimed is:

1. An access control method implemented in a web browsing session, comprising:

receiving, by an access terminal, a Hypertext Transport Protocol (HTTP) request message from a user equipment (UE), wherein the HTTP request message comprises a website domain name and an IP address, and wherein if there is a correspondence between the website domain name and an IP address cached in the UE, the IP address in the HTTP request is the IP address cached in the UE;

determining, by the access terminal, whether the IP address in the HTTP request message is an IP address of the access terminal;

if the IP address in the HTTP request message is the IP address of the access terminal, and the website domain name in the HTTP request message does not match a domain name of the access terminal, obtaining, by the access terminal, an actual IP address corresponding to the website domain name in the HTTP request message via a domain name system (DNS) resolution; and controlling, by the access terminal, the UE to access a target website corresponding to the actual IP address.

2. The access control method according to claim 1, wherein controlling, by the access terminal, the UE to access the target website corresponding to the actual IP address comprises:

replacing, by the access terminal, the IP address of the access terminal with the actual IP address corresponding to the website domain name and redirecting a browser to the actual IP address.

3. The access control method according to claim 1, wherein controlling, by the access terminal, the UE to access the target website corresponding to the actual IP address comprises:

initiating, by the access terminal, an HTTP redirection request message to the UE, wherein the HTTP redirection request message comprises the actual IP address corresponding to the website domain name, and wherein the UE retransmits the HTTP request message according to the correspondence between the website domain name and the actual IP address.

4. The access control method according to claim 3, wherein initiating, by the access terminal, the HTTP redirection request message to the UE comprises:

transmitting, by the access terminal, an HTTP redirection request packet or an HTTP redirection page to the UE.

5. The access control method according to claim 4, wherein the HTTP redirection packet is one of:

an HTTP response code 300,
an HTTP response code 301,
an HTTP response code 302, and
an HTTP response code 307.

6. The access control method according to claim 1, further comprising:

if the website domain name in the HTTP request message matches the domain name of the access terminal, transmitting, by the access terminal, a DNS reply packet including the IP address of the access terminal to the UE, so as to redirect the UE to a Web management page of the access terminal.

7. An access terminal in communication with a user equipment (UE) in a web browsing session, comprising:

a receiver, configured to receive a Hypertext Transport Protocol (HTTP) request message from the UE, wherein the HTTP request message comprises a website domain name and an IP address, and wherein if there is a correspondence between the website domain name and an IP address cached in the UE, the IP address in the HTTP request is the IP address cached in the UE; and a processor, configured to:

determine whether the IP address in the HTTP request message is an IP address of the access terminal;

if the IP address in the HTTP request message is the IP address of the access terminal, and the website domain name in the HTTP request message does not match a domain name of the access terminal, obtain an actual IP address corresponding to the website domain name in the HTTP request message via a domain name system (DNS) resolution, and control the UE to access a target website corresponding to the actual IP address.

8. The access terminal according to claim 7, wherein in controlling the UE to access the target website corresponding to the actual IP address, the processor is configured to replace the IP address of the access terminal with the actual IP address corresponding to the website domain name, and redirect a browser to the actual IP address.

9. The access terminal according to claim 7, further comprising a transmitter; wherein in controlling the UE to access the target website corresponding to the actual IP address, the processor is configured to initiate an HTTP redirection request message, and the transmitter is configured to transmit the HTTP redirection request message to the UE, wherein the HTTP redirection request message comprises the actual IP address corresponding to the website domain name, and wherein the UE retransmits the HTTP request message according to the correspondence between the website domain name and the actual IP address.

10. The access terminal according to claim 9, wherein in transmitting the HTTP redirection request message to the UE, the transmitter is configured to transmit an HTTP redirection request packet or an HTTP redirection page to the UE.

11. The access terminal according to claim 8, further comprising a transmitter; wherein if the website domain name in the HTTP request message matches the domain name of the access terminal, the transmitter is further configured to transmit a domain name system DNS reply packet including the IP address of the access terminal to the UE under control of the processor, so as to redirect the UE to a Web management page of the access terminal.

12. A computer program product comprising a non-transitory computer readable storage medium storing program code thereon for use by an access terminal in a web browsing session, the program code comprising:

instructions for receiving a Hypertext Transport Protocol (HTTP) request message from a user equipment (UE), wherein the HTTP request message comprises a website domain name and an IP address, and wherein if there is a correspondence between the website domain name and an IP address cached in the UE, the IP address in the HTTP request is the IP address cached in the UE;

instructions for determining whether the IP address in the HTTP request message is an IP address of the access terminal;

instruction for, if the IP address in the HTTP request message is the IP address of the access terminal, and the website domain name in the HTTP request message does not match a domain name of the access terminal, obtaining an actual IP address corresponding to the website domain name in the HTTP request message via a domain name system (DNS) resolution; and instructions for controlling the UE to access a target website corresponding to the actual IP address.

13. The access control method according to claim 1, wherein before receiving the HTTP request message by the access terminal, the method further comprises:

receiving, by the access terminal, a domain name system (DNS) resolution request message from the UE, wherein the DNS resolution request message comprises the website domain name inputted by a user of the UE; and sending, by the access terminal, a DNS response message to the UE, wherein the DNS response message comprises an IP address, if the access terminal fails to connect to the Internet, the IP address in the DNS response message is an IP address of the access terminal, or, if the access terminal connects to the Internet, the IP address in the DNS response message is the actual IP address corresponding to the website domain name, and wherein after receiving the DNS response message, the UE caches a correspondence between the website domain name and the IP address provided by the access terminal.

14. The access terminal according to claim 7, further comprising a transmitter, wherein before receiving the HTTP request message, the receiver is further configured to receive a domain name system (DNS) resolution request message from the UE, wherein the DNS resolution request message comprises the website domain name inputted by a user of the UE; and the transmitter is configure to send a DNS response message to the UE, wherein the DNS response message comprises an IP address, if the access terminal fails to connect to the Internet, the IP address in the DNS response message is an IP address of the access terminal, or, if the access terminal connects to the Internet, the IP address in the DNS response message is the actual IP address corresponding to the website domain name, and wherein after receiving the DNS response message, the UE caches a correspondence between the website domain name and the IP address provided by the access terminal.

15. The computer program product according to claim 12, wherein the program code further comprises:

instructions for receiving a domain name system (DNS) resolution request message from the UE before receiving the HTTP request message, wherein the DNS resolution request message comprises the website domain name inputted by a user of the UE; and instructions for sending a DNS response message to the UE, wherein the DNS response message comprises an IP address, if the access terminal fails to connect to the Internet, the IP address in the DNS response message is an IP address of the access terminal, or, if the access terminal connects to the Internet, the IP address in the DNS response message is the actual IP address corresponding to the website domain name, and wherein after receiving the DNS response message, the UE caches a correspondence between the website domain name and the IP address provided by the access terminal.

* * * * *